Inventor:
GERHARD STADE

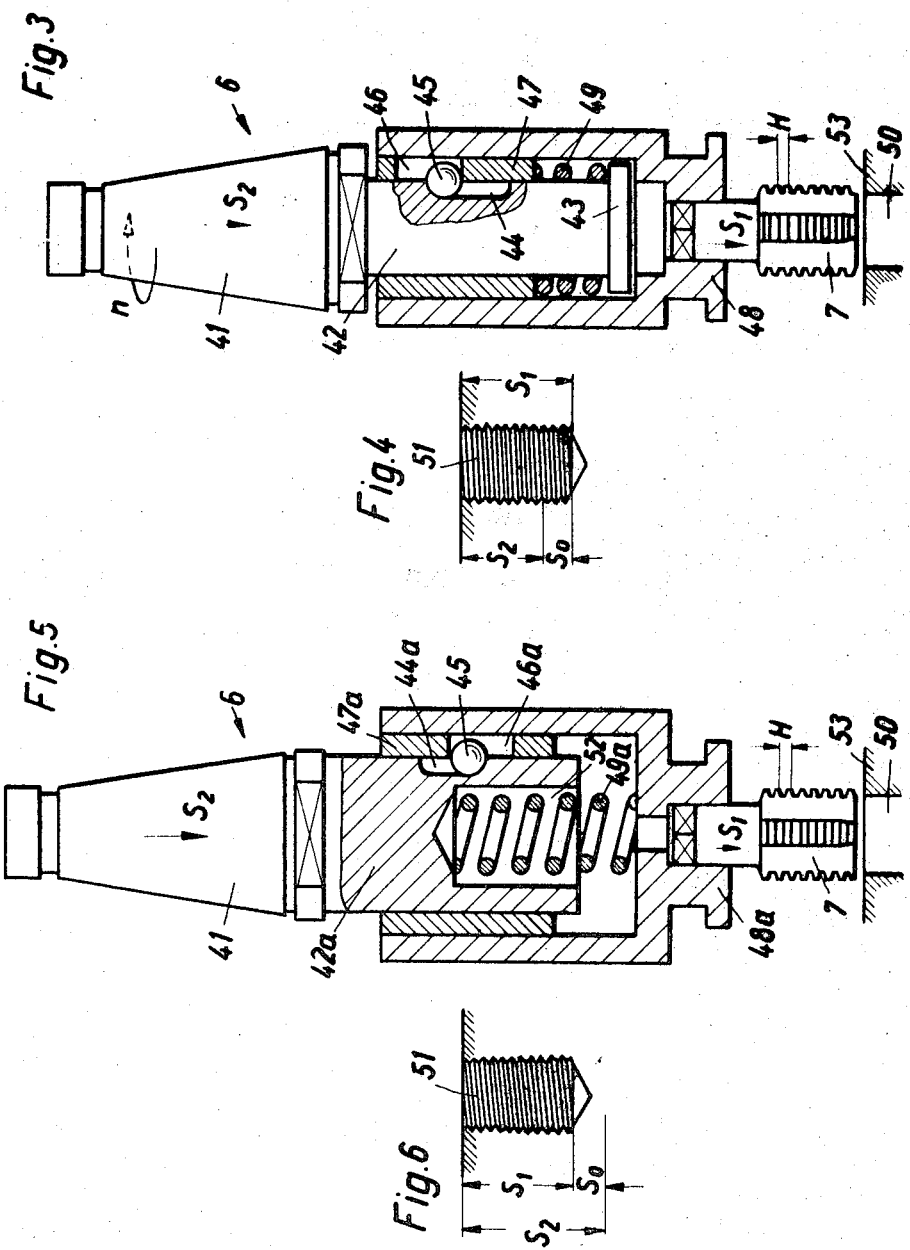

United States Patent Office 3,564,633
Patented Feb. 23, 1971

3,564,633
METHOD AND APPARATUS FOR TERMINATING THE AXIAL DEPTH OF A THREAD CUTTING OPERATION
Gerhard Stade, Berlin, Germany, assignor to Herbert Lindner G.m.b.H., Berlin, Germany
Filed Aug. 15, 1968, Ser. No. 753,011
Claims priority, application Germany, Sept. 15, 1967, P 16 27 391.9
Int. Cl. B23g *1/00, 3/00*
U.S. Cl. 10—129         10 Claims

ABSTRACT OF THE DISCLOSURE

In a thread cutting operation, such as the taping of a blind hole, wherein a tap performs a natural axial feed motion in accordance with its angular velocity and pitch, a second axial feed motion is superposed upon the natural axial feed motion of the tap, at an axial speed differing by a constant ratio from the natural axial speed of the tap. The difference between the two axial travels is compensated by an idle travel, and the axial depth of the tapping is terminated responsive to a predetermined value of the second axial travel in proportion to the two axial travels from one common starting point. The apparatus includes two drives, one rotating a drill spindle and the other feeding the drill spindle mounting axially, so that both the drill spindle and its mounting are driven synchronously in a predetermined relationship, there being a tap chucked in the drill spindle. The tap performs its own axial feed motion against the bias of a spring to accommodate the above-mentioned idle travel.

BACKGROUND OF THE INVENTION

Internal threads of specified length occur, for example, in blind holes. In such instances, it is necessary that the tap penetrate the workpiece relatively accurately to a certain depth, which means that the tap performs a certain number of revolutions which can be calculated from the depth and the pitch of the thread. This number of revolutions can be determined and controlled by means of a counter. However, a disadvantage of counters is the possibility of miscounting.

The axial motion of the tap can also be measured directly to derive control pulses from such measurement. This requires additional, relatively expensive equipment, because the start and the finish of the axial motion are determined by the rotating tap.

The programming of a certain threaded depth of a tapped hole in a drilling machine controlled, for example, by a punched tape, by a certain number of revolutions of the tap or by the axial motion of the tap, is complicated, because the speed and the pitch of the tap must be taken into consideration in any event.

SUMMARY OF THE INVENTION

This invention relates to thread cutting, such as the tapping of blind holes, and, more particularly, to a novel method of and apparatus for terminating a thread cutting operation at a predetermined axial depth of the thread, and wherein a tap performs an axial motion of its own in accordance with its angular velocity and pitch.

The objective of the present invention is to simplify and improve the termination of a thread cutting operation at a predetermined depth, where the thread cutting operation is performed by a tap, and to make such an operation easier to program.

To the extent that the invention relates to a method for terminating the depth of a thread cutting operation, such as the tapping of blind holes, and wherein a tap performs an axial motion of its own in accordance with its angular velocity and its pitch, the invention involves superposing, upon this natural axial motion of the tap, a second axial feed motion with an axial speed differing from that of the former by a constant ratio. The difference in the travels corresponding to these two axial feed motions is compensated by an idle travel. Termination of the thread cutting operation at a preselected depth is effected by the second axial feed motion in proportion to the travels effected by the two axial feed motions from one common starting point.

If there is disregarded the special case in which the second axial feed motion covers, in one revolution of the tap, the exact distance of the pitch of the tap, so that the length of the axial motion resulting from the natural motion of the tap is equal to the length of the second axial feed motion, the second axial feed motion, at the moment of terminating the thread cutting operation, may be shorter or longer than the thread depth. Thus, the idle travel is either added to or subtracted from the length of the feed motion. In both cases, the idle motion is expediently effected against the bias of a spring. The available preloading of the spring, interposed into the path, results in an accurate initial positioning of the axially movable tap. The idle travel of the spring is used, during both the back and the forward motion of the tap, to compensate for the difference between the two travels.

In accordance with the invention, the position of the axially movable mounting of the drill spindle, such as the drill sleeve or the drill head, which mounting, however, is fixed against rotation, is measured and, from this measured distance there are derived the control pulses required for terminating the thread cutting operation at a predetermined axial depth. Since the angular velocity of the drill spindle has an adjustable and definite relation to the axial feeding speed of the drill spindle mounting, the drill spindle travels a distance which deviates from the distance travelled by the tap, but which can be accurately calculated and set, as well as programmed. Termination of the thread cutting operation at a predetermined depth is thus made a function of the distance covered by the second axial feed motion, and can be measured in a simple manner and also be programmed.

The invention is also directed to apparatus for performing the method. This apparatus drives the two gear arrangements, present in a known manner, for the rotation of the drill spindle and for the axial feed of the drill spindle mounting, with programmable values for r.p.m. and feed per minute, so that both the drill spindle and the drill spindle mounting are driven synchronously in a predetermined relationship or ratio. The tap is chucked in a chuck of the drill spindle, of a known type, making possible an axial motion of the tap against the force of a spring. In the apparatus of the invention, the axial depth of the cut thread is measurable as a function of the difference between the axial feed distance of the drill spindle mounting and the axial depth of the thread, and is controllable by simultaneously interrupting both drive arrangements. Generally, the drill spindle mounting is a sleeve which is guided in the drill head so as to be movable lengthwise. However, where the sleeve is omitted, the drill spindle mounting may also be the drill head itself, guided in V-ways in the machine frame. In the latter case, the sleeve may be omitted.

However, it will generally not be desirable to do without a sleeve, and thus will be desirable to provide both axial feeding devices in the machine. The axial feed of the drill head then serves for positioning, and the drilling operation is subsequently performed with feeding of the sleeve.

To be able to program both motions, a first measuring and control device is associated with the axially movable drill spindle sleeve and is operated by rack teeth extending longitudinally of the sleeve. In addition, a second measuring and control device is operatively associated with the axially movable drill head of the machine, and is also operable by rack teeth extending longitudinally thereof. In a special case, where the sleeve is movably axially, the axial feed motion of the tap can also be performed by the drill head.

In a known manner, the drive for the drill spindle, and the feed drive of the sleeve and of the drill head, advantageously contain a reversing gear which can be reversed to a retracting operation responsive to a signal provided when the thread cutting operation has reached a predetermined axial depth, and which can be switched off when the drill spindle has reattained its starting position. The measuring and control device providing the signal functions on the basis of comparing an actual value with an intended value, and can be programmed as a function of the depth to which the hole is to be tapped.

An object of the invention is to provide an improved method of and apparatus for terminating internal thread cutting operations at a predetermined axial depth.

Another object of the invention is to provide such a method and apparatus in which a tap performs an axial motion of its own in accordance with its angular velocity and pitch, and in which a second axial feed motion is superposed upon the axial feed motion of the tap.

A further object of the invention is to provide such a method and apparatus in which the second axial feed motion is performed at an axial speed differing from the axial speed of the tap by a constant ratio.

Another object of the invention is to provide such a method and apparatus in which the difference in the two axial feeds is compensated by an idle feed, and in which termination of the thread cutting operation is effected by the superposed feed motion in proportion to the travels effected by the two axial feed motions from a common starting point.

A further object of the invention is to provide such a method and apparatus in which the idle motion or idle travel is advantageously effected against the force of a spring.

Another object of the invention is to provide such a method and apparatus in which termination of the thread cutting operation at a predetermined axial depth is effected as a function of the distance covered by the second axial feed motion, and can be measured in a simple manner and also be programmed.

For an understanding of the principles of the invention, reference is made to the following description of typical embodiments thereof as illustrated in the accompanying drawings.

BRIEF DESCRIPTION OF THE DRAWINGS

In the drawings:

FIG. 3 is an elevation view, partly in section, of a chuck movable axially responsive to tension exerted by the tap;

FIG. 4 is a somewhat schematic illustration of the distances measured in a tapped hole using the chuck shown in FIG. 3;

FIG. 5 is a view similar so FIG. 3, but illustrating a chuck which is movable axially responsive to compression forces exerted by the tap; and FIG. 6 is a view similar to FIG. 4 but related to the chuck shown in FIG. 5.

DETAILED DESCRIPTION OF THE PREFERRED EMBODIMENTS

Figure 1:
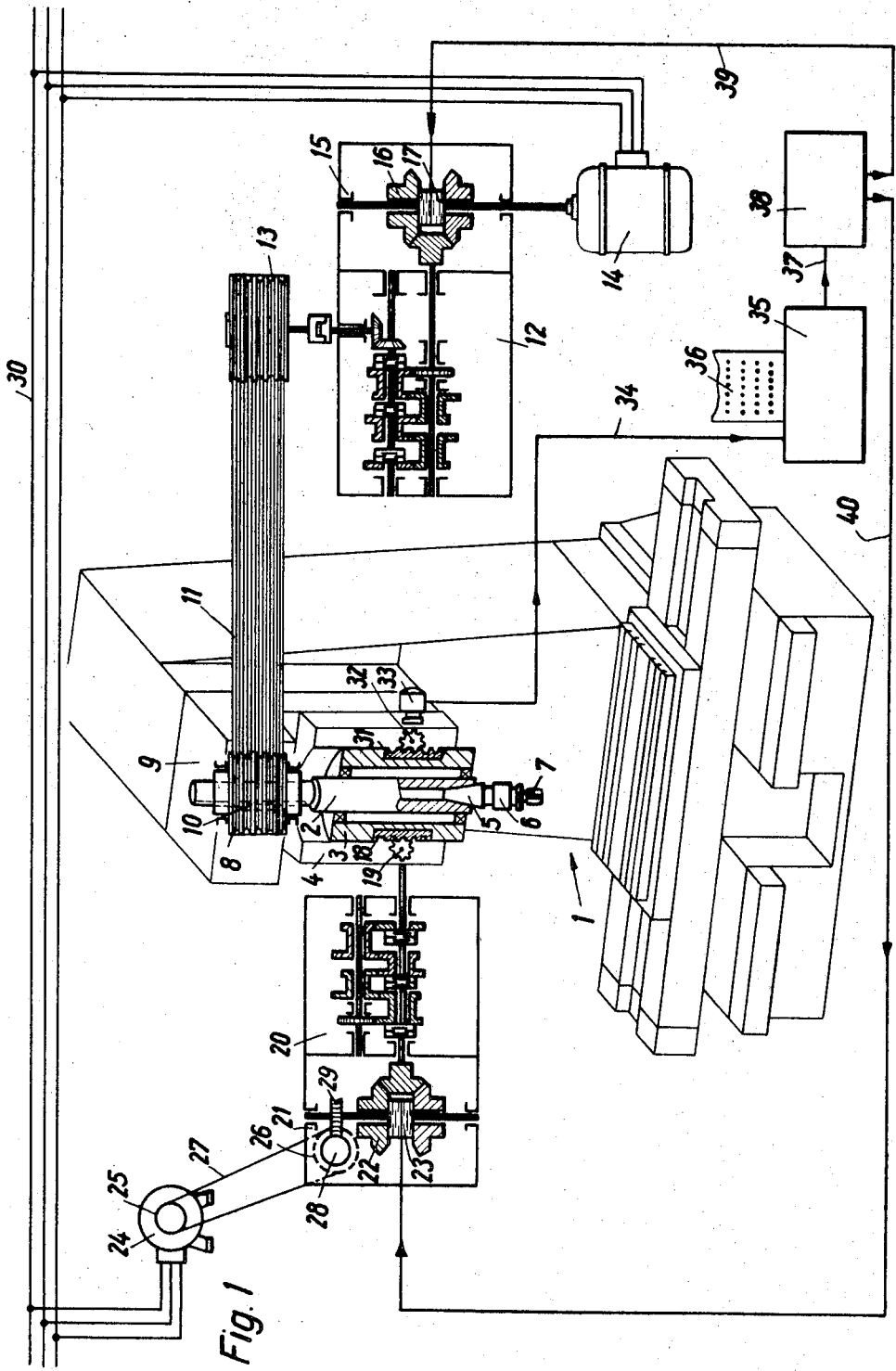
FIG. 1 is a schematic illustration of one form of thread depth terminating apparatus embodying the invention, and illustrating a drill spindle mounted in an axially movable sleeve.

Referring to FIG. 1, a drilling machine 1 is illustrated as having a drill spindle 2 mounted in a sleeve 3 so as to be fixed against axial displacement relative to sleeve 3 but to be rotatable relative to this sleeve. Sleeve 3 is guided for axial movement in drill head 4, but is non-rotatable in this drill head. Drill spindle 2 has a tool holder 5 for a chuck 6 in which there is secured a tap 7. Tap 7 has imparted thereto a rotary motion, through drill spindle 2, and at the same time has superposed thereon an axial feeding motion. Chuck 6 is a known form of equalizing chuck, illustrated in two modifications in FIGS. 3 and 5 which will be described later. Chuck 6 enables tap 7 to move axially relative to drill spindle 2.

Rotation of drill spindle 2 is effected by a pulley 8 mounted in a gear box 9 so as to be fixed against axial movement. Pulley 8 is keyed to drill spindle 2 by a key 10, so that pulley 8 and drill spindle 2 will rotate as a unit. Pulley 8 is rotated by V-belts 11 trained around pulley 8 and around a pulley 13 which is rotated by a speed changing transmission 12. Transmission 12 is driven by drive motor 14 through a reversing gear 15, associated with transmission 12, and comprising bevel gears 16 and two electromagnetic clutches 17.

Feeding of drill spindle 2 in the axial direction is effected by sleeve 3 which has rack teeth 18 extending longitudinally thereof and engaged by a pinion 19 of a speed changing transmission 20. A second reversing gear arrangement 21 is provided at the input of transmission 20, and includes bevel gears 22 and two electromagnetic clutches 23. Reversing gear 21 is driven by a second electric motor 24 through pulleys 25 and 26 and interconnected by V-belts 27. Pulley 26 drives a worm 28 engaged with a worm gear 29 in reversing gear 21. The two electric motors 14 and 24 are connected to the same power supply 30, and both drives are synchronous.

Sleeve 3 is provided with a second rack 31 extending longitudinally thereof and engaged by a second pinion 32 operatively associated with a revolution counter 33 of a known type. The revolution counter 33 measures distances, and the measured value is transmitted to the control cabinet 35 over electrical connections schematically illustrated at 34. A comparison of the actual value with the intended value is effected electronically in control cabinet 35 in a manner known per se. The intended values are fed to control cabinet 35 by a punched tape 36. If the fed intended value coincides with the reported actual value, a signal is provided to a signal amplifier 38 through electrical conductors schematically illustrated at 37. Signal amplifier 38 is connected, through electrical connections schematically illustrated at 39 and 40, with the electromagnetic clutches of the two reversing gears 15 and 21, respectively.

Figure 2:
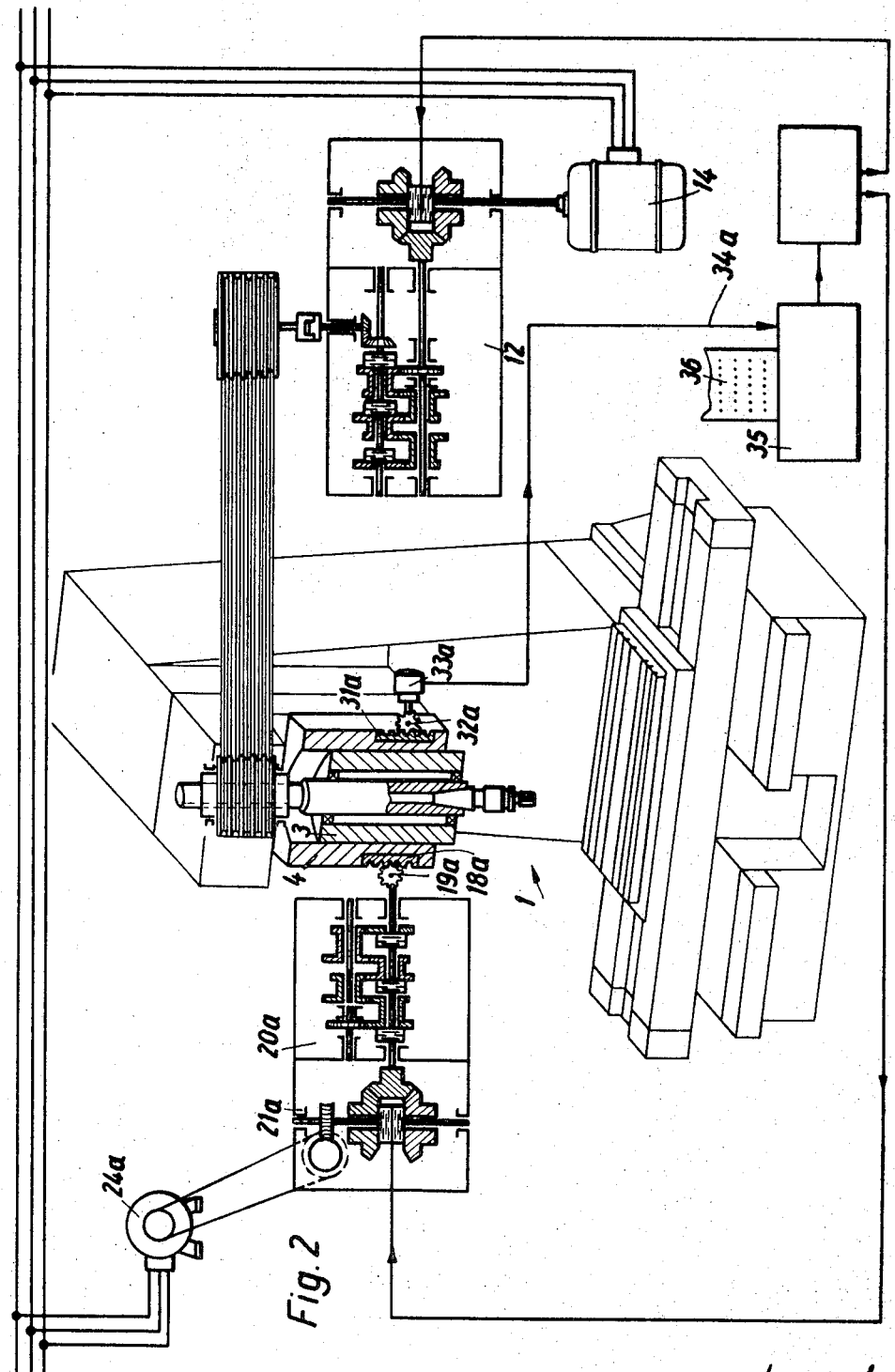
FIG. 2 is a view similar to FIG. 1, but illustrating an axially movable drill head.

FIG. 2 illustrates an arrangement in which, instead of sleeve 3, drill head 4 is movable axially. In this case, sleeve 3 is fixed against axial movement in drill head 4. Such axial immobility of sleeve 3 can be effected either by a clamp or in that its existing feed drive locks it in a certain position in drill head 4. For the sake of clarity, the feed drive of sleeve 3, as shown in FIG. 1, has not been shown in FIG. 2, but the apparatus shown in FIG. 2 may include a feed drive for sleeve 3 in the same manner as shown in FIG. 1. The description of the arrangement shown in FIG. 2, which largely coincides with that shown in FIG. 1, will be limited to to those components which differ from those shown in FIG. 1.

In FIG. 2, drill head 4 carries two racks 18a and 31a. Rack 31a is engaged by pinion 32a which actuates a second revolution meter or counter 33a connected to the control cabinet 35 through electrical connections schematically illustrated at 34a. The drive for rotating spindle 8, and including the speed transmission 12, is the same as in FIG. 1.

However, for the axial movement of drill head 4, there is provided a second speed controlling transmission 20a having a reversing gear illustrated at 21a. Transmission 20a drives pinion 19a which engages rack 18a and effects the axial movement of drill head 4. The transmission 20a and its reversing gear 21a are driven by a motor 24a. In the combined arrangement involving the apparatus shown in both FIGS. 1 and 2, there is thus one motor 14 for rotating drill spindle 2, and two motors 24 and 24a for feeding sleeves 3 and drill head 4, respectively.

Two embodiments of the chuck 6, used in accordance with the invention, are shown in FIGS. 3 and 5, respectively. Referring to FIG. 3, chuck 6 has a cone 41 which fits into the tool holder 5 of the drill spindle. Cone 41 has a central shaft 42 terminating in a collar 43, and shaft 42 has a longitudinally extending groove 44 of a depth sufficient to accommodate one half of the diameter of a ball 45. The other half of ball 45 is positioned in a second groove 46 of a bushing 47, which is firmly connected to external sleeve 48 carrying the tap 7. A compression spring 49 is seated between the inner annular surface of collar 43 and the lower annular end face of bushing 47. Spring 49 is prestressed, and determines the axial position of tap 7 in chuck 6. The chuck shown in FIG. 3 is responsive to tension exerted by tap 7.

Thus, tap 7 performs a motion of its own in accordance with the angular velocity $n$ of spindle 2 and the pitch H of tap 7, when a thread 51 is tapped in a hole 50 which may be a blind hole. When the desired or intended axial depth of the tapping or the thread is attained, tap 7 has covered a distance $S_1$ (FIG. 4), and the feed drive of spindle 2 has covered the shorter distance $S_2$ in the same time. The difference between these two distances is indicated at $S_0$. Since distance $S_2$ is less than distance $S_1$, chuck 6 is extended in tension. The termination of the thread cutting at a predetermined axial depth occurs, as mentioned previously, as a function of the axial feeding distance $S_2$.

The negative difference $S_0$ in the two distances, as shown in FIG. 4, can also be positive under different ratios of distances $S_1$ and $S_2$. This is illustrated in FIG. 6. In the case assumed in FIG. 6, with the thread depth $S_1$ of tap 7 remaining the same, the axial feed distance $S_2$ is greater than the thread depth $S_1$. The distance difference $S_0$ is added to the distance $S_1$ travelled by tap 6, whose chuck 6 is now stressed in compression.

Such a chuck is shown in FIG. 5. Cone 41 has a central shaft 42a having a downwardly opening axial recess 52 seating a part of the length of spring 49a. The other end of spring 49a engages the inner end face of an external sleeve 48a. Inner shaft 42a has a longitudinally extending groove 44a, and bushing 47a, firmly fixed in external sleeve 48a had a longitudinally extending slot 46a. Half of ball 45 lies in each of the slots 44a and 46a. The axial distance made available by grooves or slots 44a and 46a is travelled when tap 7 is stressed in compression, as is the case with the distance ratio shown in FIG. 6. Termination of the thread cutting occurs as a function of the distance $S_2$, which is greater, in this case, than the distance $S_1$. The selection of the particular chuck to be employed will depend on whether the distance ratios are so adjusted that the tap 7 is stressed in tension or is stressed in compression.

The apparatus of the invention operates in the following manner. Drill spindle 2 first travels in a rapid feed at angular velocity $n$ for the tapping and to the programmed depth shortly above the workpiece upper surface 53 (FIGS. 3 and 5). Drill spindle 2 then travels at the same angular velocity and the predetermined rate of axial feed provided by the feed drive, and to the programmed depth $S_2$ (FIGS. 4 and 6). When the intended and actual values coincide, the programmed depth $S_2$ is attained. At this instant, a signal is transmitted by control cabinet 35, and this energizes the clutches of the reversing gears 15, 21 and/or 21a, respectively. The energization of these clutches reverses the rotational direction of the two transmissions, one for the rotation of the spindle and the other for the axial feed thereof. Tap 7 retracts from the tapped hole at the same rate of actual displacement, until it resumes the same position above the workpiece surface 53. From this last position, where feeding ceases, the drill spindle 2 is rapidly returned to its starting position.

What is claimed is:

1. In a thread cutting operation, such as the tapping of a blind hole, wherein a tap performs a natural axial feed motion of its own in accordance with its angular velocity and pitch: the method for terminating the axial depth of the thread cutting at a preset value comprising superposing, upon the natural axial feed motion of the tap, a second axial feed motion at an axial speed differing, by a constant ratio, from the natural axial speed of the tap; comparing the actual second axial feed motion with programmed values thereof; adjusting the actual second axial feed motion to conform to such programmed values thereof; compensating the difference between the two axial travels by an idle travel; and terminating the axial depth of the tapping responsive to a predetermined programmed value of the second axial feed motion in proportion to the travels effected by the two axial feed motions from one common starting point.

2. In a thread cutting operation, the method for terminating the axial depth of the thread cutting, as claimed in claim 1, in which, at the moment of termination of the thread cutting, the axial travel due to the second axial feed motion is less than the axial depth of the thread, and that the idle travel and the travel due to the second axial feed motion are additive.

3. In a thread cutting operation, the method for terminating the axial depth of the thread cutting, as claimed in claim 1, in which, at the moment of termination of the thread cutting, the travel due to the second axial feed motion is greater than the axial depth of the thread, and that the idle travel is subtracted from the travel due to the second axial feed motion.

4. In a thread cutting operation, the method for terminating the axial depth of the thread cutting, as claimed in claim 1, in which the idle travel is effected against the bias of a spring.

5. Apparatus for terminating the axial depth of thread cutting in internal thread cutting mechanism, said apparatus comprising, in combination, a drill spindle; mounting means mounting said drill spindle for rotation and axial displacement; a chuck secured to said drill spindle; a tap mounted in said chuck; means, including a spring, in said chuck providing for a natural axial feed motion of said tap, relative to said drill spindle, in accordance with the angular velocity and pitch of said tap; first transmission means operatively associated with said drill spindle and effective to rotate the same; second transmission means operatively associated with said drill spindle and effective to feed the same axially at an axial speed differing, by a constant ratio, from the natural axial speed of said tap; respective driving means operatively associated with said transmission means and operating said transmission means to rotate said drill spindle and to feed said drill spindle axially at programmable angular velocities and linear speeds which are in a predetermined ratio; measuring means operatively associated with said drill spindle and measuring the axial travel thereof during cutting of a thread by said tap; and means operable, responsive to the axial travel of said drill spindle attaining a predetermined value, which is different from the axial depth of the cut thread by a predetermined ratio, to interrupt the rotation and axial feed of said tap in a thread cutting direction.

6. Apparatus for terminating the axial depth of thread cutting in an internal thread cutting mechanism, as claimed in claim 5, in which said drill spindle is rotatable in its mounting means but fixed against axial displacement relative thereto; said mounting means being fixed against rotation but being axially displaceable; said first transmission means being operatively associated directly with said drill spindle and said second transmission means being connected to said mounting means.

7. Apparatus for terminating the axial depth of thread cutting in an internal thread cutting mechanism, as claimed in claim 6, in which said drill spindle mounting means comprises an axially displaceable drill head and a sleeve mounted in said drill head and mounting said drill spindle; said measuring means comprising a first measuring and controlling device operatively associated with said sleeve and driven by means including rack teeth extending longitudinally of said sleeve.

8. Apparatus for terminating the axial depth of thread cutting in mechanism for internal threading, as claimed in claim 6, in which said measuring means comprises a measuring and control device operatively associated with said drill head and driven by means including rack teeth extending longitudinally of said drill head.

9. Apparatus for terminating the axial depth of thread cutting in an internal thread cutting mechanism, as claimed in claim 7, including means maintaining said sleeve against axial displacement in said drill head; said measuring means further including a second measuring and controlling device operatively associated with said drill head and driven by means including a rack extending longitudinally of said drill head.

10. Apparatus for terminating the axial depth of thread cutting in an internal thread cutting mechanism, as claimed in claim 5, in which each of said transmission means includes a respective reversing gear; said measuring means, when the axial movement of said drill spindle in the thread cutting direction attains said preselected value, providing a signal to said reversing gears to reverse the direction of rotation and the direction of axial feed of said drill spindle and said tap, and to deenergize said driving means when said drill spindle and said tap reattain the starting position.

References Cited
UNITED STATES PATENTS

| | | | |
|---|---|---|---|
| 2,074,470 | 3/1937 | Herrmann | 10—129 |
| 2,242,293 | 5/1941 | Eden et al. | 10—136 |
| 2,310,124 | 2/1943 | Shartle | 10—136 |
| 2,600,779 | 6/1952 | Knosp et al. | 10—136 |
| 2,845,639 | 8/1958 | Jorgensen et al. | 10—136 |
| 3,381,550 | 5/1968 | Smith | 10—129 |

CHARLES W. LANHAM, Primary Examiner

E. M. COMBS, Assistant Examiner